A. H. FORD.
HEADLIGHT.
APPLICATION FILED OCT. 30, 1916.
1,235,675.
Patented Aug. 7, 1917.
2 SHEETS—SHEET 1.
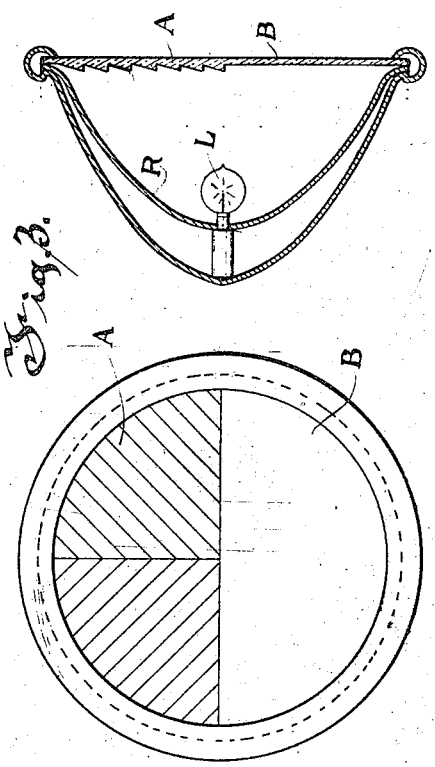
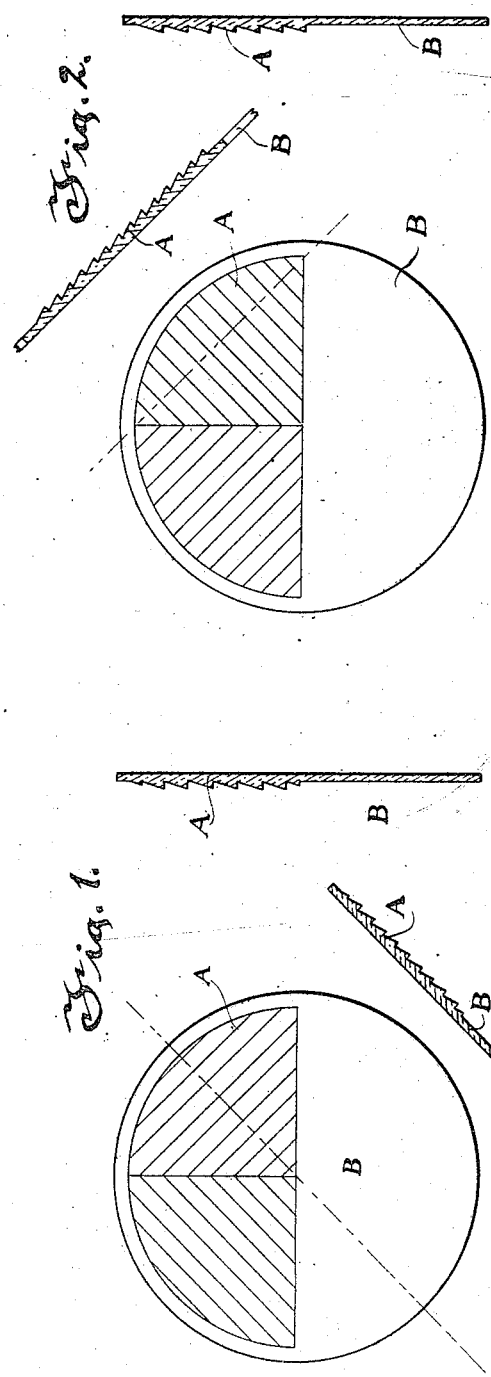
INVENTOR
Arthur H. Ford
By Morsell, Keeney & French
ATTORNEYS

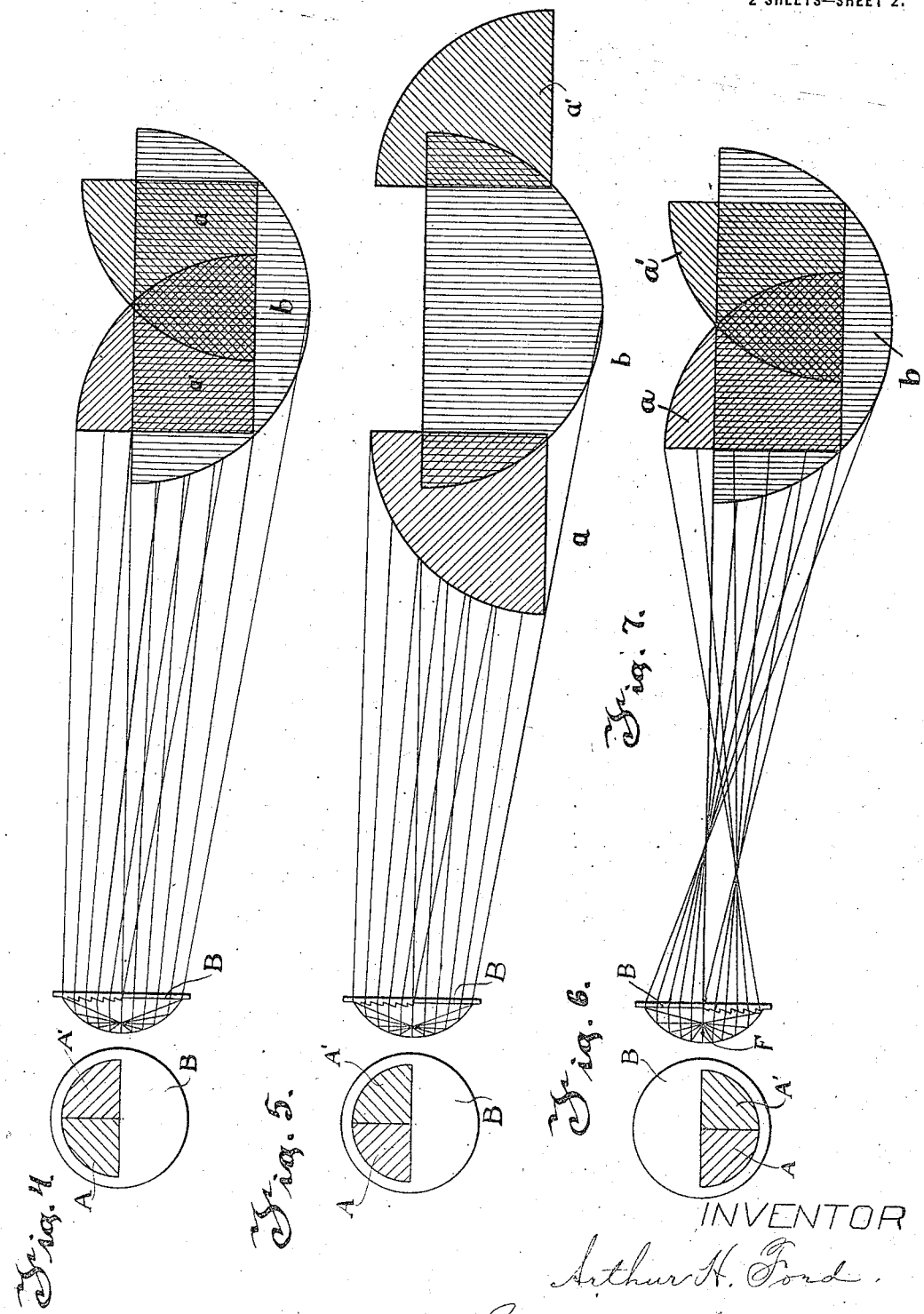

UNITED STATES PATENT OFFICE.

ARTHUR H. FORD, OF IOWA CITY, IOWA.

HEADLIGHT.

1,235,675.  Specification of Letters Patent.  Patented Aug. 7, 1917.

Original application filed August 23, 1915, Serial No. 47,001; forfeited, now renewal No. 154,338, filed March 12, 1917. Divided and this application filed October 30, 1916. Serial No. 128,362.

*To all whom it may concern:*

Be it known that I, ARTHUR H. FORD, a citizen of the United States, and resident of Iowa City, in the county of Johnson and State of Iowa, have invented new and useful Improvements in Headlights, of which the following is a description, reference being had to the accompanying drawings, which are a part of this specification.

My invention relates to that class of lamps known as head-lights; such as are used commonly on automobiles and street cars. It has for its object the decrease in the brightness of that portion of the beam which is objectionable because of its blinding effect on the eyes of a person approaching the light and the increase of the brightness, or size, of that portion of the beam which is useful in lighting the roadway.

The usual form of lamp, of the kind mentioned, consists of a light source placed at or near the focus of a reflector which is a paraboloid of revolution; the whole being mounted in a metal case with a glass front. The result of this arrangement of the parts is that an intense beam of light is thrown along the axis of the reflector. When the light source is a point and the reflector a perfect paraboloid of revolution, with the light source at its focus, the beam is parallel. When the light source is between the mirror and its focus the beam is divergent. When the focus is between the light source and the mirror, the beam is convergent between the reflector and a point a distance in front of the reflector depending on the relation between the focal distance of the reflector and the distance of the light source from it. Beyond the point of convergence the beam is divergent. Such a beam will be called a crossed beam in the following discussion.

The light source most commonly used at present is an incandescent electric lamp having a spiral filament so placed that the axis of the filament is coincident with the axis of the mirror and so held that the position of the lamp is adjustable along this axis. This kind of an arrangement will be assumed in the following explanations; though my improved device is not confined in its application to the use of such a light source or method of mounting the lamp.

The ordinary requirements of the illumination from a head-light are that the center of the beam shall be the brightest portion; the beam shall be thrown well ahead of the vehicle which carries the light. This requirement is best met by placing the lamp with the tip of the filament substantially at the focus of the mirror with the rest of the filament between the mirror and its focus; then placing the head light with the axis of the mirror horizontal; this giving a divergent beam. This requirement can also be met by placing the lamp so that the base of the filament is near the focus of the mirror with the rest of the filament ahead of the focus; thus giving a crossed beam. With either of these adjustments the road is illuminated directly in front of the vehicle carrying the head-light, but not at the sides, except at points near enough the vehicle to receive a strong unreflected light. This unreflected light is not of sufficient intensity to be of value when driving at high speed. Furthermore, that portion of the light which shines above the horizontal plane through the lamp is wasted and in addition serves to blind any person who may be on the road looking toward the approaching vehicle.

Many devices have been proposed to reduce the blinding effect, but practically all of them are objectionable in that they of necessity reduce much of the useful light at the same time that they reduce the blinding effect.

My experiments have shown that the light which comes directly from the lamp, without being first reflected from the mirror, causes little or no blinding effect; therefore my device is so designed as to deflect the reflected rays of light from the objectionable direction to a useful direction without affecting the direct rays of light to any marked degree.

When the lamp is adjusted with the major portion of the filament back of the focus of the reflector the beam is divergent and the objectionable part is that which comes from the upper part of the reflector. When the lamp is adjusted with the major portion of the filament ahead of the focus of the reflector the beam is crossed and the objectionable part is that which comes from the lower portion of the reflector. The following is a description of fronts designed for use with a divergent beam and a crossed beam.

This application is a division of an application filed by me on August 23, 1915, Serial No. 47,001, and also shows another specific form of the invention.

My invention is shown in detail in the accompanying drawings:

Figures 1 and 2 show two variations in the details of the design.

Fig. 3 shows the relation of the headlight front to the lamp and reflector.

Figs. 4 and 5 show the directions of the light rays and forms of lighted field produced by the use of the fronts shown in Figs. 1 and 2.

Fig. 6 shows a form of front used for a crossed beam.

Fig. 7 shows the directions of light rays and form of lighted field produced by the use of the front shown in Fig. 6.

Referring to Figs. 1 and 2. The device consists essentially of a transparent headlight front with the lower portion "B" of plane glass and the upper portion "A" of prismatic glass; the prisms of the two quadrants being mutually inclined in opposite directions and having their bases down. A front of this kind is placed over the opening of a parabolic mirror "R" Fig. 3, having a lamp "L" placed so that a portion of the filament is at the focus of the mirror with the major portion between the mirror and its focus.

When adjusted in this way the light field will be of essentially one of the shapes shown in Figs. 4 and 5; depending on the inclination of the prisms with respect to the horizontal plane through the lamp and their optical angle. It is essential that the prisms have their bases down; but they may be made integral with the rest of the headlight front or in separate pieces.

The optical angle is determined in accordance with the well known laws for refraction of light and is preferably such that none of the light reflected from the mirror is directed above the horizontal plane through the axis of the reflector.

A front of the type shown in Figs. 2 and 5 is used where it is desired to illuminate a broad field at a relatively low intensity and one of the forms shown in Figs. 1 and 4 where it is desired to illuminate a narrow field at a high intensity. In each of these figures the lighted field marked "a" receives its light through that portion of the front marked "A", that marked "a'" through that portion of the front marked "A'" and that marked "b" through that portion of the front marked "B."

A front of similar design is used for a crossed beam; but with the clear part placed at the top and the prismatic part at the bottom. A front of this type is shown in Figs. 6 and 7 and is used where the lamp lies beyond the center of focus F of the reflector so as to produce what has been previously designated a crossed beam. In this instance the beam being crossed the upper part of the mirror reflects the rays downwardly and the prismatic portion of the front also turns the upwardly deflected rays from the lower part of the mirror downwardly thus producing the same effect as the construction previously described. This is not the equivalent of turning the front over; for the bases of the prisms must be down in each case.

What I claim as my invention is:

1. A lens for headlights comprising an upper plane portion and a lower prismatic portion, said prismatic portion having a plurality of sets of refracting prisms inclined toward each other to refract the light downwardly.

2. A head-light front, for use in connection with a head-light having a parabolic mirror adjusted so as to give a crossed beam of light, in which the upper portion is plane while the lower portion is composed of two mutually inclined sets of prisms, with the bases down, so as to deflect the light received from the mirror to a direction below the horizontal.

3. A head-light front, for use in connection with a head-light having a parabolic mirror adjusted to give a crossed beam of light, in which the upper portion of the front is plane while other portions are composed of two mutually inclined sets of prisms, with the bases down, to deflect all the light received from the mirror to a direction below the horizontal.

4. A lens for headlights comprising a plane upper sector, and two similar lower sectors composed of refracting prisms with their bases down and their edges inclined toward each other to refract the light downwardly.

5. A lens for headlights comprising a plane upper sector, and two similar lower sectors composed of refracting prisms with their bases down and their edges inclined downwardly toward each other to refract the light downwardly.

In testimony whereof, I affix my signature.

ARTHUR H. FORD.